United States Patent Office 2,760,876
Patented Aug. 28, 1956

2,760,876

WATER RESISTANT COATING COMPOSITIONS

Simon S. Schulman, Brooklyn, N. Y., assignor to Siliphane Corporation of America, a corporation of New York No Drawing. Application November 25, 1952,
Serial No. 322,581

14 Claims. (Cl. 106—76)

It is among the objects of the present invention to provide a cementitious coating material which may be stored and transported in the form of a dry powder that need merely be mixed with water for use, without the need for added wetting agent, organic binder, fibrous filler or the like, which may be applied to any building structure, especially to a porous building structure such as one of brick, cinder blocks, stucco, cement or plaster, which coating is thoroughly waterproof and highly water-repellent, unaffected by oxidation or atmospheric conditions, which will not effloresce due to entrapment of water and will yet not interfere with transpiration, the coating prepared from which does not shrink but rather expands and fills open pores in a hard surface, which will withstand a high hydrostatic head, all of these objectives being attained by a single coating without the need for a second coating.

The invention is based on the discovery that when alkyltriethoxysilane, where the alkyl is from 1 to 5 carbon atoms or the reaction product of the silane with alkali metal salt in appropriate proportions is effectively coated upon particulate components, either upon pigment particles or extender particles or both, of a coating composition the objectives are attained when such coated particles are incorporated in inorganic cementitious coating material.

The alkyltriethoxysilane according to the invention, is preferably applied directly upon the surface of the pigment or extender particles and is preferably the ethyltriethoxysilane, though in its broader aspects the invention is applicable if the methyl, propyl, butyl, or amyl group is used as the alkyl element.

The alternative reaction product of said silane with alkali metal salt, preferably sodium salt, is employed with pigment particles that have first been coated for enhanced wetting and dispersion, with a solid fatty acid such as the stearate or the palmitate of a metal, such as aluminum or zinc, such first coating being preferably of aluminum stearate and about one-seventh the weight of the pigment particles.

According to the invention, the coating of alkyltriethoxysilane or the reaction product of said silane with alkali metal salt is applied by spraying the same upon the pigment or extender particles while these are being tumbled under pressure and heat. It is important that the spraying and tumbling be conducted in a dry environment as otherwise a premature reaction will occur. To that end this process is performed in a sealed mill and the thus treated pigment or extender is desirably promptly stored in sealed chambers such as metal cans so as to avoid exposure to the air prior to admixture of such particles with the other components to make up the cementitious coating material and after such dry cementitious coating material has been prepared, it is desirably promptly packaged in the same manner to avoid exposure to air prior to admixture with water for application to the surface to be coated.

The pigment, usually of particle size not coarser than 300-mesh, is of any desirable type, such as titanium dioxide as such or admixed with one or more components such as barium sulphate, zinc sulphate, calcium carbonate or magnesium carbonate, or it may be of metallic oxides such as yellow, black or red iron oxide or iron chromate and the extenders, if used, may be of suitable clay including bentonite and asbestos.

In the complete powdered composition, the alkyltriethoxysilane is present in proportion of 1 to 10 per cent by weight of the pigment.

The alkyltriethoxysilane, preferably the ethyltriethoxysilane, which is a liquid, is sprayed upon the pigment particles while these are being tumbled under pressure of 15 to 25 pounds per square inch at temperature of 25 to 80° C. in a sealed mill. For this spraying there would be added to the pigment about 7 per cent by weight of alkyltriethoxysilane, of which about one-third is ordinarily lost during the spraying process so that the pigment becomes coated with about 5 per cent by weight of the silane.

In this coating operation, the pigment swells materially to in the order of five times its original volume, since the coating prevents coalescence or the close packing of the original pigment particles.

The ethyltriethoxysilane is preferred, because it is more easily controlled than the corresponding methyl compound, which is more difficult to mix with water since it tends to become hydrophobic after exposure to the atmosphere, especially in a humid environment. The propyl, butyl and amyl compounds take considerable time to become hydrophobic and therefore cementitious coating composition incorporating the same does not set as rapidly as does that prepared with the preferred ethyl compound.

The coating of ethyltriethoxysilane is preferred where it is of thickness constituting about 5 per cent by weight of the pigment particle, because if this coating were materially thicker, there would be some interference with the hydration of the cement in which the coated pigment is incorporated. On the other hand with materially less than 5 per cent of the ethyltriethoxysilane, the water repellency is frequently not sufficient for practical purpose.

The embodiment utilizing the alkali metal salt reaction product of the alkyl silane such as ethyltriethoxysilane is less preferred, because that class of compounds such as the sodium ethyl siliconate, $NaCH_3.CH_2SiO_2$, is difficult to handle and likely to be injurious to the operators. To minimize discomfort and hazard to the operator, the said reaction product would preferably first be mixed with the bentonite and pigment and only then added to the rest of the mix. Moreover the process utilizing said reaction product process is somewhat more expensive than with alkyltriethoxysilane. Furthermore the said reaction product, as above noted, is applied to pigment particles that have preferably first been coated with aluminum stearate or the like.

The pigment directly coated with alkyltriethoxysilane, preferentially with ethyltriethoxysilane or coated with sodium siliconate upon an inner coating of aluminum stearate or the like, is incorporated in the inorganic cementitious coating composition that is made up essentially of white Portland cement, lime and pigment, with the addition of other components, preferably including a minor proportion of a binder such as sodium silicate which also expedites the hardening of the cement, a component such as bentonite which expands by taking on water and a component such as calcium chloride to expedite hydration, to furnish additional calcium for reaction, and to fix excess moisture from the air.

One desirable formula of cementitious coating material, especially desirable where the pigment particles are directly coated with alkyltriethoxysilane, is by weight as follows:

White Portland cement 48 to 70 parts, preferably 63 parts
Hydrated lime 5 to 20 parts, preferably 15 parts
Pigment 4 to 22 parts, preferably 15 parts
Calcium chloride 1 to 5 parts, preferably 4 parts
Sodium silicate 0.25 to 2 parts, preferably 1 part
Bentonite 0.25 to 5 parts, preferably 1 part
Aluminum silicate 0.25 to 2 parts, preferably 1 part Where the pigment or extender particles are coated with aluminum stearate and have an outer coating of sodium siliconate, the formula above mentioned is also preferred, though the aluminum silicate component would in that case desirably be omitted.

For use, desirably about seven pounds of the powder from the can in which it was packaged, is mixed in about two quarts of water—preferably seven and one-quarter pounds to four and one-half pints of water. The mixture is stirred and should be allowed to stand for about twenty minutes before application, whereupon it is painted in the usual manner upon the surface to be coated.

When the coating composition is applied to the wall in aqueous dispersion, hydrolization takes place, the water combining with the ethyltriethoxysilane with the evolution of ethanol in the form of a gas and the substitution for the three ethoxy groups of three hydroxyl groups. The reaction is exothermic and takes place slowly and is not completed in much less than forty-eight hours. Only after the reaction is substantially completed does a marked water repellency or reduction in water absorption of the paint occur.

With the alkyltriethoxysilane, the water-repellency is attained at less cost and the product is less toxic and more nearly neutral than where the sodium siliconate is employed. However, since the inner coating of aluminum stearate (which promotes wetting and dispersion) is not used upon the pigment particles in that embodiment, more extensive milling is required in order to attain uniformity of dispersion.

Pigment of any color coated in the manner set forth to render it waterproof and water-repellent may be incorporated in the cementitious coating material to produce any decorative effect desired.

By a single coating applied to the wall, the second coating is dispensed with that would be needed to attain any approximation to a waterproof covering where the cementitious coating material is devoid of a component such as that incorporated therewith according to the present invention.

Thus there is attained a waterproof coating of any decorative effect that is highly water-repellent, unaffected by oxidation or atmospheric conditions, yet does not interfere with transpiration, that will maintain its efficacy even under a substantial hydrostatic head and will in its expansion fill all of the pores in any hard surface.

As many changes could be made in the above composition and method, and many apparently widely different embodiments of this invention could be made without departing from the scope of the claims, it is intended that all matter contained in the above description shall be interpreted as illustrative and not in a limiting sense.

Having thus described my invention what I claim as new and desire to secure by Letters Patent of the United States is:

1. A substantially air-tight packaged product consisting essentially of a component for inorganic cementitious coating material, said component being a particulate solid component of coating material selected from the group consisting of titanium dioxide, barium sulphate, zinc sulphate, calcium carbonate, magnesium carbonate, yellow, red and black iron oxide, iron chromate, mixtures thereof, clay and asbestos, said particles being in the order of 300 mesh and having a covering thereon completely coating the entire surface thereof, said coating being of alkyltriethoxysilane the alkyl group of said silane having from 1 to 5 carbon atoms, said silane being from 1 to 10 per cent of the weight of the particle it covers said coating being in the hydrophilic, unpolymerized state.

2. The combination recited in claim 1, in which the coating of the individual particles is of ethyltriethoxysilane.

3. A substantially air-tight packaged pigment consisting substantially solely of particles substantially of the following composition by weight:

|  | Parts |
| --- | --- |
| Titanium dioxide (TiO$_2$) | 1 to 3 |
| Silica | 50 to 53 |
| Alumina | 40 to 46 |
| Iron oxide | 0.25 to 0.5 |
| Alkyltriethoxysilane in which the alkyl has from 1 to 5 carbon atoms | 1 | and in which the latter component is in the form of a coating on the exterior of the pigment particles said coating in the hydrophilic, unpolymerized state.

4. The combination recited in claim 3, in which the coating is of ethyltriethoxysilane.

5. A substantially air-tight packaged pigment consisting substantially solely of the following components by weight:

|  | Parts |
| --- | --- |
| Titanium dioxide (TiO$_2$) | 1 to 3 |
| Silica | 50 to 53 |
| Alumina | 40 to 46 |
| Iron oxide | 0.25 to 0.5 | in which the pigment particles have a coating thereon of aluminum stearate of weight in the order of one-seventh that of the pigment particle and an outer coating of alkali metal salt reaction product of alkyl silane of about 1 per cent by weight of the pigment particle and in which said outer coating is in the hydrophilic, unpolymerized state.

6. A substantially air-tight packaged cementitious coating composition consisting essentially of Portland cement, hydrated lime, pigment, calcium chloride, sodium silicate and bentonite, and in which the pigment particles are essentially of the composition and proportions thereof recited in claim 3.

7. A substantially air-tight, packaged cementitious coating material having substantially the following composition by weight:

|  | Parts |
| --- | --- |
| White Portland cement | 63 |
| Hydrated lime | 15 |
| Pigment | 15 |
| Calcium chloride | 4 |
| Sodium silicate | 1 |
| Bentonite | 1 | and in which the pigment is composed of

|  |  |
| --- | --- |
| Titanium dioxide | 1 to 3 |
| Silica | 50 to 53 |
| Aluminum oxide | 0.25 to 0.5 | the particles of pigment having an outer coating of substance selected from alkyltriethoxysilane with 1 to 5 carbon atoms in the alkyl group and the alkali metal salt reaction product thereof and being of weight of approximately 5 per cent of the weight of the pigment particles coated thereby the alkyl group of silane having from 1 to 5 carbon atoms said outer coating being in the hydrophilic, unpolymerized state.

8. The combination recited in claim 7, in which the coating on the pigment particles directly covers the same and is of ethyltriethoxysilane.

9. The combination in claim 7, in which the coating on the pigment particles consists of layers, including an inner layer of aluminum stearate and an outer layer of the sodium salt reaction product of alkyltriethoxysilane.

10. The method of producing the pigment component of a cementitious coating material which is coated with liquid substance selected from the group consisting of alkyl triethoxy silane, the alkyl group of which has from 1 to 5 carbon atoms, said substance being in the hydrophilic unpolymerized state, which comprises tumbling the pigment particles under pressure and heat in the absence of water while spraying the same with said liquid substance until a coating ha been built up on the pigment particles of approximately 5 per cent by weight thereof the alkyl group of said silane having from 1 to 5 carbon atoms.

11. The method of producing the pigment component of a cementitious coating material which has an outer coating of sodium silane in the hydrophilic unpolymerized state, which comprises coating the pigment particles with aluminum stearate and thereupon applying said outer coating of sodium salt reaction product of the silane, the latter coating being applied by spraying the same upon the pigment particles under pressure and heat until the coating of such reaction product built upon the particles has weight about 1 per cent of that of the pigment said method being performed in the absence of water.

12. A substantially air-tight packaged cementitious coating material comprising in addition to Portland cement and hydrated lime, calcium chloride, and a pigment component in particulate form, having an outer coating of a substance selected from alkyltriethoxysilane, with one to five carbon atoms in the alkyl group thereof, and the alkali metal salt reaction product of such silane said coating being in hydrophilic and unpolymerized state.

13. The method of preparing for application to the surface to be coated the cementitious coating material claimed in claim 12, which consists in mixing about 7 pounds of the coating material in powdered form in about 4 pints of water and letting the mixture stand for at least 20 minutes before applying it to the surface to be coated, with the resultant reaction of water with the silane for a hydrophobic polymerized end product of the coating.

14. A substantially air-tight packaged cementitious coating material comprising substantially the following composition by weight:

| | Parts |
|---|---|
| White Portland cement | 48 to 70 |
| Hydrated lime | 5 to 20 |
| Pigment | 4 to 22 |
| Calcium chloride | 1 to 5 |
| Sodium silicate | 0.25 to 2 |
| Bentonite | 0.25 to 5 | and in which the pigment is composed of

| | |
|---|---|
| Titanium dioxide | 1 to 3 |
| Silica | 50 to 53 |
| Aluminum oxide | 0.25 to 0.5 | the particles of pigment having an outer coating of substance selected from alkyltriethoxysilane with 1 to 5 carbon atoms in the alkyl group and the alkali metal salt reaction product thereof and being of weight of approximately 5 per cent of the weight of the pigment particles coated thereby said outer coating being in the hydrophilic, unpolymerized state.

References Cited in the file of this patent

UNITED STATES PATENTS

| | | |
|---|---|---|
| 1,509,406 | Kraus | Sept. 23, 1924 |
| 2,244,449 | Ellis | June 3, 1941 |
| 2,507,200 | Elliott et al. | May 9, 1950 |
| 2,510,661 | Safford | June 6, 1950 |
| 2,563,555 | Safford | Aug. 7, 1951 |
| 2,567,316 | Bidaud | Sept. 11, 1951 |
| 2,595,465 | Keene et al. | May 6, 1952 |
| 2,650,171 | Schaaf | Aug. 25, 1953 |

FOREIGN PATENTS

| | | |
|---|---|---|
| 650,131 | Great Britain | Feb. 14, 1951 |